United States Patent

Halldorsson et al.

[11] Patent Number: 5,960,022
[45] Date of Patent: Sep. 28, 1999

[54] DIODE-PUMPED SOLID-STATE RING LASER GYROSCOPE

[75] Inventors: Thorsteinn Halldorsson; Nikolaus Peter Schmitt; Karin Bauer, all of Munich; Hartmut Neumann, Oberhaching, all of Germany

[73] Assignee: Daimler-Benz Aerospace AG, Munich, Germany

[21] Appl. No.: 08/765,594

[22] PCT Filed: Feb. 8, 1996

[86] PCT No.: PCT/EP96/00517

§ 371 Date: Nov. 10, 1997

§ 102(e) Date: Nov. 10, 1997

[87] PCT Pub. No.: WO96/24971

PCT Pub. Date: Aug. 15, 1996

[30] Foreign Application Priority Data

Feb. 10, 1995 [DE] Germany ............... 195 04 373

[51] Int. Cl.[6] ............... G01C 19/66; H01S 3/083
[52] U.S. Cl. ............... 372/94; 356/350; 372/70
[58] Field of Search ............... 372/69, 70, 92, 372/93, 94; 356/349, 350

[56] References Cited

U.S. PATENT DOCUMENTS

| | | | |
|---|---|---|---|
| 3,308,395 | 3/1967 | Sorokin | 372/66 |
| 3,760,297 | 9/1973 | Thompson | 372/94 |
| 4,444,503 | 4/1984 | Schiffner | 356/350 |
| 4,477,188 | 10/1984 | Stiles et al. | 356/350 |
| 4,792,962 | 12/1988 | Miyauchi et al. | 372/94 |
| 4,839,903 | 6/1989 | Simms et al. | 372/94 |
| 5,027,367 | 6/1991 | Rea, Jr. et al. | 372/94 |
| 5,237,584 | 8/1993 | Shannon et al. | 372/93 |
| 5,241,555 | 8/1993 | Spitzer | 372/94 |
| 5,367,377 | 11/1994 | Rahn | 356/350 |

FOREIGN PATENT DOCUMENTS

| | | |
|---|---|---|
| 40 33 299 | 8/1991 | Germany. |
| 40 08 226 | 9/1991 | Germany. |
| WO 94/21012 | 9/1994 | WIPO. |

OTHER PUBLICATIONS

*Optics Communications 101* (no month) (1993), pp. 371–376 entitled "Electrooptically fast tunable miniature diode-pumped Nd:YAG ring laser" by I. Freitag et al.
*Optics Letters,* vol. 17, No. 5, Mar. 1, 1992, pp. 378–380 entitled "Fused-silica monolithic total-internal-reflection resonator" by S. Schiller et al.
*Optics Letters,* vol. 10, No. 2, Feb. 1985, pp. 65–67 entitled "Monolithic, undirectional single-mode Nd:YAG ring laser" by Thomas J. Kane et al.
*Laser und Optoelektronik 2,* (no month) 1985, pp. 131–140 entitled "The Laser Gyro Influence of Ring Laser Geometry on Gyro Performance" by R. Rodloff.

*Primary Examiner*—John D. Lee
*Attorney, Agent, or Firm*—Evenson, McKeown, Edwards & Lenahan, P.L.L.C.

[57] ABSTRACT

The invention concerns a diode-pumped solid-state ring laser gyroscope consisting of a diode-pumped solid-state laser made from a doped crystal or glass in the form of a square or cube for monoaxial or triaxial measurements; limitation and stabilization of the laser mode is achieved by precise matching of the pumping radiation to the mode volume of the ring laser. Outcoupling of the laser radiation is done by making the light tunnel through a slit to a dielectric plate which is moved by an actuator. Frequency modulation of the signal is done as required by coupling an acoustic wave into the laser medium or by precise spatial modulation of the diode excitation.

15 Claims, 5 Drawing Sheets

DIODE-PUMPED SOLID-STATE RING LASER GYROSCOPE

BACKGROUND AND SUMMARY OF THE INVENTION

This invention relates to a diode-pumped solid-state ring laser gyro and, more particularly, to a diode-pumped monolithic solid-state ring laser which uses the total reflection on the boundary surfaces for the deviation of the resonator mode.

A currently wide-spread method for measuring the rotating movement of a moved apparatus—for example, of a vehicle, a ship, an airplane or a satellite—is the use of ring laser gyros (RLK). The gyro is used for the control and stabilization of the movement, the "northing", as well as for the calibration of acceleration sensors in inertial navigation systems. For the wide-area navigation in the airplane, a long-term stability of better than 0.01°/h is required; for the ship navigation, even 0.001°/h; however, for measurements in combination with other navigation methods, such as the Global Positioning System (GPS) as well as for short-term measurements of rotational movements in the vehicle, the missile and the combat airplane, the requirement is at 10°/h to 100°/h. The measuring range is normally between 0–10°/s. Since the ring laser gyro always detects only one axis of rotation because of its planar construction, three gyros are required which are situated perpendicularly with respect to one another for measurements in all directions in space.

The physical basis of the ring laser gyro is the Sagnac effect which describes the influence of a rotational movement on the propagation of light waves. When a light wave is deviated by 360° by a mirror reflection or in an optical wave guide and is caused to superimpose on itself, ring waves are created. Since both rotating directions are equivalent, a left-rotating as well as a right-rotating ring wave can form simultaneously. When the wave-guiding structure is rotated, the frequency of the moving wave will increase and the frequency of the wave moving in the opposite direction will decrease. Particularly in the ring laser gyro (RLK), the opposed waves in the ring are continuously optically amplified. Simultaneously, a portion of the two waves is coupled out of the ring by means of a dividing mirror and is superimposed on a photo detector for measuring the difference frequency. The difference frequency is proportional to the rate of rotation $\Omega$ and proportional to the area A enclosed by the waves, but inversely proportional to the light path L and the wave length $\lambda$ in the amplifying medium:

$$\Delta v = 4A\Omega/L \lambda \quad (1)$$

When a laser beam of the wave length $\lambda=0.63$ $\mu$m is deviated along the sides of a square with a side length of 4 cm, the frequency shift (with the rate of rotation $\Omega$ 15°/h) caused by the rotation of the earth is $\Delta v=4.4$ Hz. A rotating speed of 500°/s, which may occur during a rolling motion of a combat plane, will supply $\Delta v=400$ kHz as the gyro signal.

The commercially available laser gyros use HeNe gas lasers. The resonator is designed either as an isosceles triangle with three deviating mirrors or as a square with four deviating mirrors. Two gas discharge tubes along the beam path provide the laser amplification at the wave length 0.633 $\mu$m or 1.152 $\mu$m. So that the structure remains as mechanically and thermally stable as possible, the laser is usually integrated in a block made of a material with an extremely low coefficient of expansion. The deviating mirrors are mounted on the corners in a vacuum-tight manner. The bores are evacuated and are filled with the HeNe mixture to a pressure of a few torr. The gas discharge is ignited between two electrodes.

The deviating mirrors form the optical resonator. As in the case of a longitudinal resonator, one or two of the mirrors are spherically curved; the others are planar. A deviation by 60° (isosceles triangle) or by 90° (square) in the plane on each mirror provides for the formation of a closed ring wave. However, for this purpose a very precise alignment of the mirrors is required, as in the case of the linear resonator.

One of the deviating mirrors is optically semireflecting. A portion of the two ring waves is coupled out and both are guided together in a special deviating prism on a photodetector where, with a slight inclination of the wave fronts, they form an interference band pattern. The Sagnac effect, which occurs during a rotation of the gyro, is detected as a movement of the interference bands over its sensitive surface. By means of the moving direction of the interference bands, which is detected by means of a double photodiode, the rotating direction of the gyro can be clearly determined.

The angle of slope of the two beams $\phi$ and the size of the photodetector surface $d_d$ is adapted to one another such that the diameter of the detector corresponds approximately to the distance between two interference minima $d_i$:

$$d_d \sim d_i = \lambda/2 \sin \phi \quad (2)$$

It is the object of the photodetector to count the number of intensity bands N which is proportional to the angle of rotation $\theta$, with $$N = \int_0^t \Delta v dt = \frac{4A}{\lambda L} \int_0^t \Omega dt = \frac{4A\theta}{\lambda L} \quad (3)$$

So that the interference pattern remains spatially stable, the laser must operate in a transversal fundamental mode and simultaneously on a single longitudinal mode of the resonator. The fundamental mode and its spatial stabilization is forced by the limiting of the beam path by means of screens. The longitudinal monomode operation occurs automatically in the case of a forming closed ring wave.

The absolute position of the laser frequency must be maintained to be very stable so that no measuring errors occur because of frequency fluctuations which, although they have the same effect for both ring waves, on the whole contribute to the noise background. This is carried out by adjusting the position of the mirrors by means of piezo-actuators to a fixed frequency value. Faulty measurements which may occur are bias errors because of a non-uniform amplification of the two opposed ring waves, a difference in the course of the two optical beam paths and an asymmetry in the ion transport in the gas discharge (Langmuir flow).

The best-known disturbance in a ring laser gyro is the so-called "frequency lock-in" as the result of an optical cross-coupling between the opposed ring waves. During the reflection of the laser waves on the multi-layer dielectric deviating mirrors, a small fraction of scattered light occurs on the surface which is partly scattered back into the opposite direction in the beam path. This scattered light is further amplified by the laser process and now competes with the second measuring wave. With the very high frequency of the laser waves, for example, $v=4.7\times10^{14}$ Hz at $\lambda=0.63$ $\mu$m, and a measuring difference frequency in the range of Hz to several tens of kHz, the phenomenon of the "frequency lock-in" of two oscillators of a comparable frequency will occur, which is generally known in the field of electronics. The ring waves shift toward a common frequency (injection locking) and the difference frequency—the actual measuring frequency—will disappear.

Since the "lock-in" does not occur before the lower frequency range, this problem can be reduced or eliminated by the artificial displacement of the difference wave lengths (that is, targeted biasing) into a higher frequency range. In the commercially available apparatuses, three different methods are used for this purpose. The first consists of causing the whole ring laser gyro structure to rotate at a fixed rotating speed (Raytheon Co., USA). In the second, the structure is caused to carry out a periodic vibration (dithering—Honeywell Co., USA). The third method (Northrop Co., USA) uses magneto-optical deviating mirrors. By means of the transversal Kerr effect in thin magnetic mirror layers of the deviating mirrors, as a result of the switching-over of a magnetic field, a periodic phase shift is exercised on the deviated ring waves.

Basically, the ring laser gyro on the basis of gas lasers has the following disadvantages. (1) Miniaturizing is possible only up to a limited degree because a certain minimum amplifying length is required. (2) The laser structure is mechanically and thermally sensitive. (3) The use of high voltage for the operation of the gas discharge is disadvantageous (tube technology). (4) The overall efficiency of the laser is very low with <0.01% (thermal stress). (5) The manufacturing of mirrors which are extremely low in scattered light for suppressing the "lock-in effect" is high in cost. (6) Screens for limiting and stabilizing the beam path generate scattered light which promotes the "lock-in effect". (7) The rotating or wobbling of the ring laser gyro in order to bypass the "lock-in effect" during the measuring results in high technical expenditures, is expensive and generates mutual disturbances of the measurements in three axes. (8) The elimination of asymmetries in the gas transport in the discharge tube requires very high technical expenditures. (9) The magnetic field for generating the Kerr effect in magneto-optical mirrors simultaneously induces a disturbing Zeeman line splitting of the laser line in the gas discharge.

Despite these high technical expenditures, the ring laser gyro with the HeNe-laser is in very wide-spread use as a component of inertial platforms in airplanes and ships. In the case of much lower requirements on the angular resolution (>10°/h), as in missiles, for the directional control of robots and automatic machines, recently the so-called passive fiber gyro has increasingly been used where the Sagnac effect results in the phase shifting of oppositely rotating light waves in glass fibers. This technology has the important advantage that opto-semiconductors of a low frequency quality, long service life and low cost can be used as the light source. A disadvantage is the thermal and mechanical sensitivity of the relatively unwieldy large fiber coil and the low achievable angular resolution.

Furthermore, monolithic ring lasers have been known for some time in literature (see, for example, T. J. Kane and R. L. Byer, "Monolithic, Unidirectional Single-Mode Nd:YAG Ring Laser", *Optics Letters*, Vol. 10, No. 2, Page 65 (1985) and are already offered on the market by Lightwave Co. in the U.S. as particularly frequency-stable laser sources (MISER). Such lasers are the object of intensive research because they can supply a single-mode very narrow-band radiation for various applications into the power range close to 1 W (see, for example, I. Freitag, P. Rottengatter, A. T ünnermann and H. Schmidt, "Frequency Adaptable Diode-Pumped Miniature Ring Lasers", *Laser und Optoelektronik* 25 (5) 1993). It is decisive for the applications of these lasers that the second ring wave is suppressed by the installation of an optical diode in the beam path, for example, by means of the magneto-optical effect.

Despite progress in satellite navigation as the result of GPS and the introduction on the market of new processes for measuring the rate of rotation, as, for example, by measuring the effect of the Coriolis force on tuning fork vibrations, there is a wide demand today for the ring laser gyro as an alternative measuring process or as a measuring process supplementing the GPS in which, for example, interruption times in contact with the satellite must be bridged. Additional applications are for the measuring of short-term rotating movements in the vehicle and in machines. Although the technique of the gas laser ring laser gyro is fully developed, the technical expenditures for a wide application in the future are too high. Their manufacturing is too cost-intensive and their useful life is limited to a few thousand operating hours. The low-cost miniaturized semiconductor lasers may be conceivable as laser amplifiers in open ring laser mirror structures but, because of the low frequency stability and poor radiation quality, they are unsuitable for the implementation of a high-quality ring laser gyro and are too expensive for lower-quality demands. Because of its poor measuring resolution, the fiber gyro is a replacement only for certain applications and can basically not have a small construction There is therefore needed a diode-pumped solid-state ring laser gyro which is not only simplified and miniaturized in its mechanical construction but also has no movable parts; is insensitive to external disturbances; with respect to the measuring resolution and measuring precision corresponds to a high-quality HeNe ring laser gyro, and permits a simultaneous rate of rotation measurement about all space axes in a monolithic gyro body.

These needs are achieved by a diode-pumped monolithic solid-state ring laser which uses the total reflection on the boundary surfaces for the deviation of the resonator mode. The solid-state ring laser is formed as a gyro in that two ring waves rotating in opposite directions in a common solid-state laser material are simultaneously amplified. From the difference frequency of the two ring waves, a rate of rotation of the now solid-state ring laser gyro is derived. The solid-state medium itself consists of doped crystal or glass material of a preferably square or rectangular shape.

DETAILED DESCRIPTION OF THE DRAWINGS

So far, lamp-pumped solid-state lasers have not been considered for the suggested application, particularly because of their poor beaming quality and their instable frequency behavior. As the result of the excitation by means of diode lasers and the connected significantly improved efficiency and lower thermal stress to the solid-state laser material, compactly constructed laser systems can be produced which, by means of relatively low expenditures, result in a beaming quality and frequency stability which is comparable to and even better than that of gas lasers. Furthermore, for the implementation of miniaturized ring laser gyros, in comparison to gas lasers, the diode-pumped solid-state laser offers the advantages of a high amplification in a low material volume and of a lower frequency and amplitude noise.

Particularly suitable for this purpose are diode-pumped solid-state lasers having laserable ions of rare earth metals by means of which different host crystals and glasses are doped. The best known laser of this type is the Nd:YAG-laser with the emission wave length of 1.06 $\mu$m which is excited by means of GaAlAs laser diodes of the wave length $\lambda$=0.81 $\mu$m. As the laser-active ion, the neodymium can also be built into other host crystals and glasses. Other laserable ions of the rare earth metals are, for example, erbium, holmium, thulium and praseodymium which, because of their different energy transitions, will then also provide other emission wavelengths. In particular, the wavelength of the Nd-ion 1.32 $\mu$m and the wavelength of the erbium ion 1.54 $\mu$m are of interest here. These wavelengths coincide with the most commonly used wavelengths of fiber communication and, when the ring laser gyro is implemented, simultaneously permit the use of inexpensive components of the telecommunication industry. In principle, in addition to the rare earth ion lasers, the ring laser gyro can also be implemented by means of other types of solid-state lasers, such as Cr lasers, Ti sapphire.

The object of the invention, specifically the use of the Sagnac effect of two opposed ring waves of a monolithic solid-state ring laser as a gyro is suggested here for the first time. It is based on the use of the solid body simultaneously as the light path for the ring waves and as their amplification medium. As a result, a mechanically and thermally very stable basic gyro body can be implemented in which, by means of the utilization of the total reflection on the boundary surfaces for the beam deviation, the disturbing "scattered mirror light" is minimized. The radiation of the excitation source is imaged by means of the boundary surface of the basic body into the laser beam path and therefore permits a largely mechanical and thermal decoupling of both systems.

Figure 1:
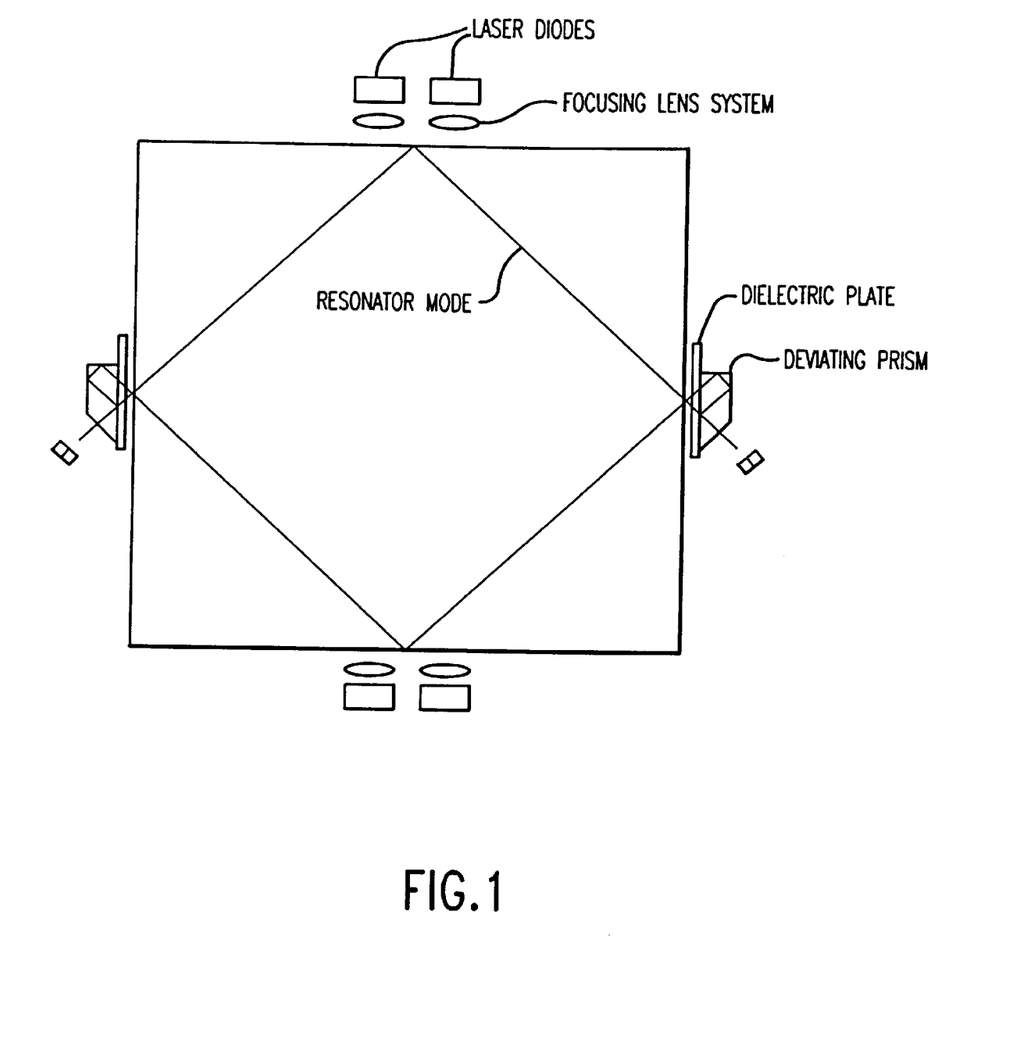
FIG. 1 is a basic diagram of an embodiment according to the invention with laser diodes as excitation sources, a ring laser gyro body made of solid-state laser material and decoupling planes with deviation prisms.

As illustrated in FIG. 1, there is disclosed an embodiment wherein the laser is built as a square plate. Its typical size, which can easily be implemented by means of today's manufacturing devices, would, for example, be a side length of 1 cm and a height of 3 mm. In the Nd:YAG material with the refractive index n=1.823, the critical angle of total reflection $\theta$=33.3°, and in the Nd:Glass with n=0.57, $\theta$=39.7°, or sufficiently smaller than the deviating angle 45° of the laser beams on the boundary surfaces within the square.

In some cases, it is advantageous to use, instead of a square, a rectangular plate with a different side length. In this case, the angle of incidence will change according to the difference in the lengths of the sides. Here, the angle must then not fall below the critical angle of the total reflection.

For detecting the rotation about all three space axes, the basic laser body must be designed as a cube or cuboid in the case of which three mutually independent ring lasers are constructed on three mutually perpendicular cutting planes of the cube or cuboid, as will be explained later. However, basically the same methods of construction apply to the cube as to the lasers in square plates.

By means of the utilization of the total reflection of the boundary surface for the switching of the laser beam, a considerable reduction of scattered light is achieved in comparison to the external dielectric mirrors of a HeNe ring laser gyro. By means of a standard polish of the surface, the scattered light portion can be suppressed to an imperceptible extent provided that the surface also remains very clean.

Scattered light may be formed in the beam path through the host crystal. Possible sources of such a volume scattering are optical inhomogeneities, such as concentration fluctuations of the doping, variations in the crystal growth, crystal faults, microcracks, enclosed gas bubbles and density fluctuations as the result of mechanical and thermal tensions. For these reasons, special care must be taken in the selection of the laser material, the design of the doping concentration and the drawing and processing of the material.

In order to generate a stable mode in a ring laser, one or two of the deviating mirrors must be curved. For reasons of symmetry and manufacturing, it is useful to grind a curvature on two mutually opposite sides. For the suppression of all higher modes except the fundamental mode and in order to simultaneously keep the position of the fundamental mode stable with respect to time, a further limitation of the beam path is required. A stable longitudinal mode, that is, a mode in the frequency space, will then automatically be adjusted during the formation of a ring wave.

Figure 2A:
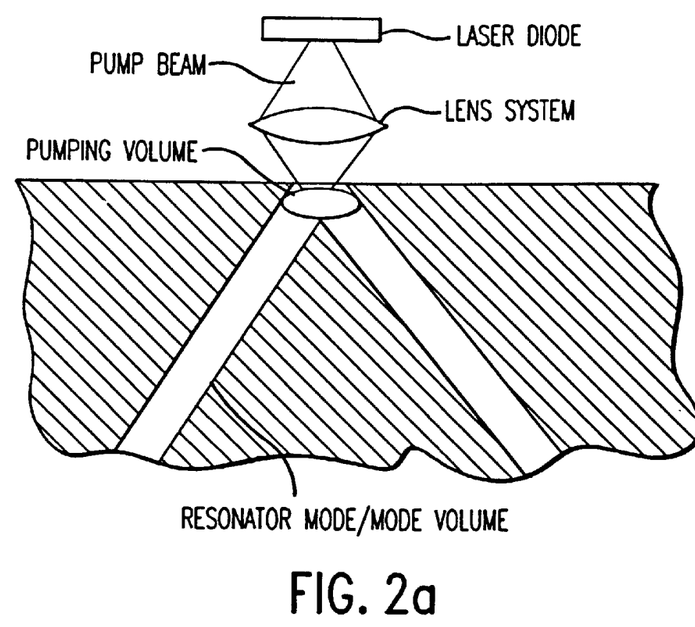
FIG. 2a is a drawing with respect to the adapted focussing of the pump radiation into the resonator mode volume in the case of a short absorption length.
Figure 2B:
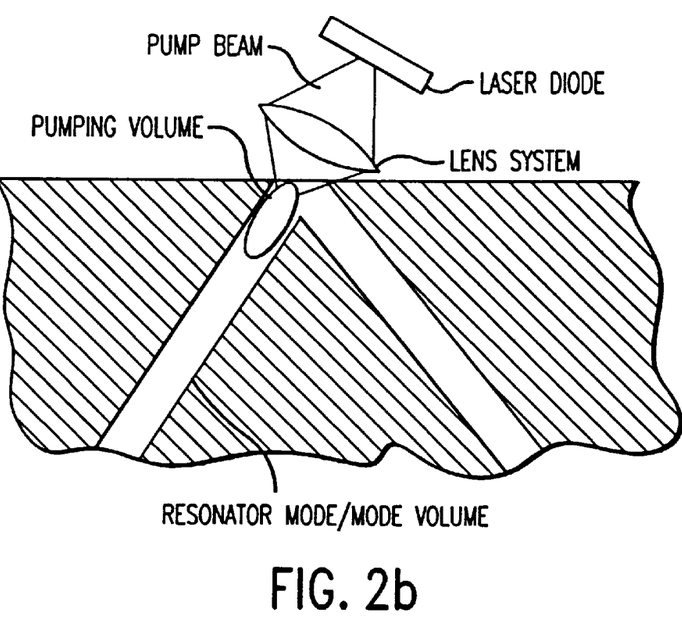
FIG. 2b is a view of a tilted arrangement according to FIG. 2a in the case of a relatively large absorption length.
Figure 3:
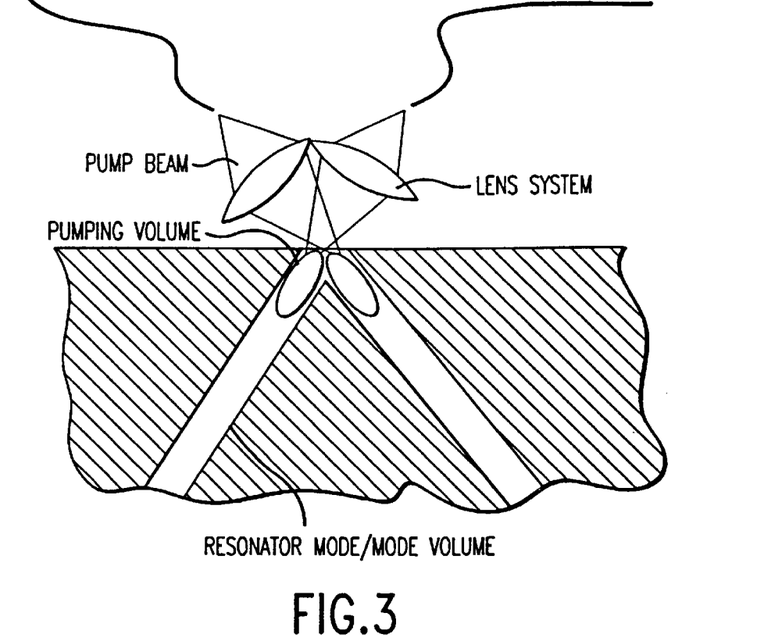
FIG. 3 is a view of an arrangement analogous to FIG. 2, in the case of which the pump light radiation is, however, guided to the resonator mode by way of glass fibers.

For the mode selection, the invention here suggests a method of mode filtering and stabilizing which, in comparison to the use of screens, as in the case of the HeNe ring laser gyros which cause a damping by light diffraction, has the important advantage of avoiding the forming of the interfering scattered light of the screens. This method, which is shown in the embodiment in FIG. 2, consists of adapting the volume of the excitation by the pump light to the mode volume of the fundamental mode of the ring laser with respect to space so well that only this one mode is amplified in the laser medium. This is possible because the size of the excitation source, which may be either the emission surface of the diode or its glass fiber end, can be optimally adapted to the size of the laser mode. With a diameter of the surface or of the fiber below 100 $\mu$m and with a corresponding imaging lens system, the light can be imaged on defined areas of the mode volume having a diameter of 100–200 $\mu$m with a precision in the $\mu$m-range. According to the absorption length of the laser medium for the pump wave length, the pump radiation must be focussed collinearly to the resonator mode into the laser material (FIG. 2b). In contrast, in the case of a sufficiently short absorption length, it is sufficient for the pump light to be focussed into the reflection range of the mode. The pump light radiation can be focussed directly from the laser diode into the laser material. However, a more flexible construction is achieved in that the pump light is first coupled into glass fibers and is then guided to the ring laser gyro (FIG. 3).

As far as the beam course control is concerned, the invention suggests, as illustrated in the embodiment in FIG.

3, to adjust the beam with respect to the space to an optimal course through the crystal by means of the use of several adjacent excitation sources (diodes or fibers) which are controlled individually. The adjacent light sources (two or three) are caused to partially superimpose by an imaging in the range of the mode volume. By means of individual controlling the diodes, it will then be possible to vary the intensity distribution in the superimposition range. As a result of a simultaneous measuring of the output performance or of the beam course and the use of this signal as a control signal, the course of the fundamental mode within the stability range of the ring resonator can therefore be controlled and the laser can be brought to optimal operating conditions. Such a beam course control is possible also in the construction with separate excitation ranges, as shown in FIG. 3. In this case, the excitation ranges would then have to be slightly displaced with respect to the optimal optical axis of the ring wave. By means of two laser diode pairs, which are placed perpendicularly on one another, this beam control is possible also in two axes. An application of this process simultaneously on several sides of the gyro results in additional advantages.

Concerning the displacement of the measuring frequency, it should be noted that, by means of a control of the beam course simultaneously on several sides of the gyro body, it is also possible to cause the ring wave to rotate for a short time about small angles. This can be carried out, for example, by a periodic asynchronous control of the diodes on two opposite sides of the gyro. In the case of this one-sided rotation which, for example, with a displacement of 10 $\mu$m and a side length of the gyro of 1 cm, amounts to the angle 0.12°, the Sagnac effect will also occur. The invention therefore suggests to use this effect, similar to the case of magneto-optical mirrors in the HeNe gyro, in order to shift the frequency measuring range of the gyro outside the "lock-in range". With a modulation frequency of, for example, 1 kHz, the maximal rate of rotation will then amount to 120°/sec, which would be completely sufficient for all practical cases. According to Equation (1) with the wavelength $\lambda=1$ $\mu$m, the corresponding frequency shift would then be 20 kHz.

Figure 4:
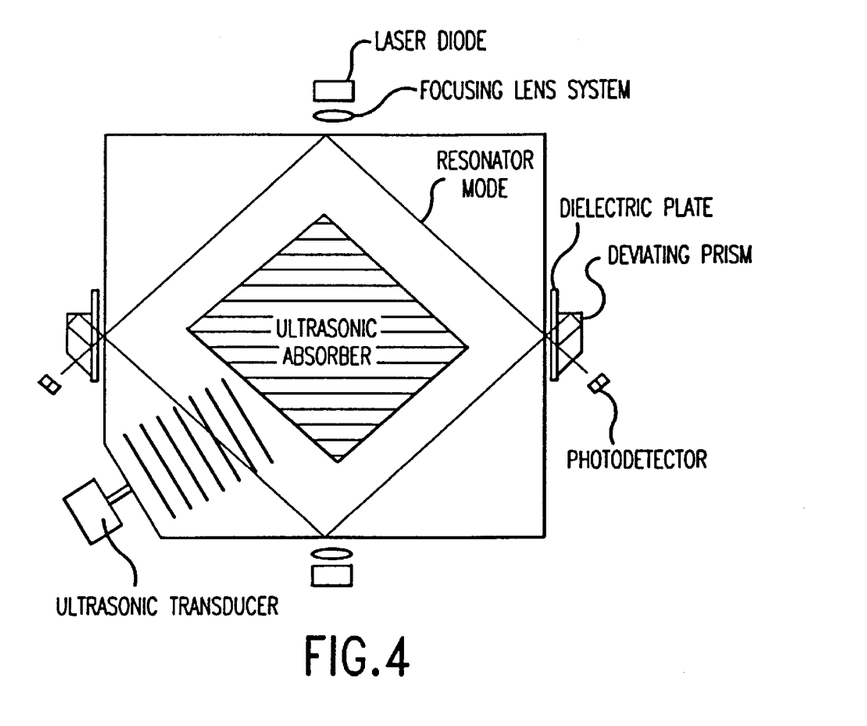
FIG. 4 is a view of a ring laser gyro arrangement having ultrasonic wave generators for the frequency splitting of the ring waves rotating in opposite directions.

However, as a result of using the solid body as the beam-guiding medium, additional paths open up for the one-sided frequency shift of one ring wave with respect to the other, specifically by the utilization of the Doppler shift of the light wave on an acoustic wave which propagates through the medium. As illustrated in FIG. 4, the invention provides for the introduction of a sound wave from one external sound generator as a travelling wave into the crystal in such a manner that the opposite ring waves experience a different Doppler shift. This can be carried out by a suitable selection of the angle of incidence of the sound wave on the gyro medium. Since, with a typical speed of sound of 3–6 km/sec. in glasses, the Doppler shift, in the case of a perpendicular impact of the light onto the sound wave front, would be in the very high frequency range of 3–6 GHz, it is recommended to guide the sound wave only at a very small angle of a few degrees transversely to the ring wave of the gyro through the solid body. The difference of the Doppler shift on the two ring waves will then be in the range of 10–100 MHz, which facilitates the later signal processing. So that interferences because of reflections and diffraction of the sound wave are prevented, it is further recommended to integrate a sound absorber into the solid-state material, as illustrated in FIG. 4. In this manner, the known effect of the frequency lock-in can be bypassed while using a solid-state laser material.

For decoupling the measuring wave from the ring laser gyro, it is suggested to use a defined optical cross-coupling to a dielectric plate which is moved very close to the reflecting surface. It is known that, in the case of a total reflection of light on boundary surfaces, for example, glass against air or glass against glass in fiber-optical wave guides, the wave is not completely reflected away on the geometrical boundary surface but the wave tunnels out of the surface before it is returned again into the medium without losses. When a dielectric plate is caused to approach the boundary surface up to a distance of fractions of the wave length, a portion of the wave penetrates into this dielectric and is transmitted there as a light beam. The intensity of the passing-through wave is a function of the angle of incidence of the wave onto the boundary surface and the air gap. By means of a variation of the distance in the range of $\lambda/2$ to 0, the wave can be modulated from total reflection to complete transmission. This effect has been used for the decoupling of light waves in solid-state lasers (see S. Schiller, I. I. Yu, M. M. Fejer and R. L. Byer, "Fused-Silica Monolithic Total-Internal-Reflection Resonator", *Optics Letters* Vol. 17, No. 5, Page 378 (1992), however, so far it has not been used for the decoupling of the measuring wave from a laser gyro.

Figure 5:
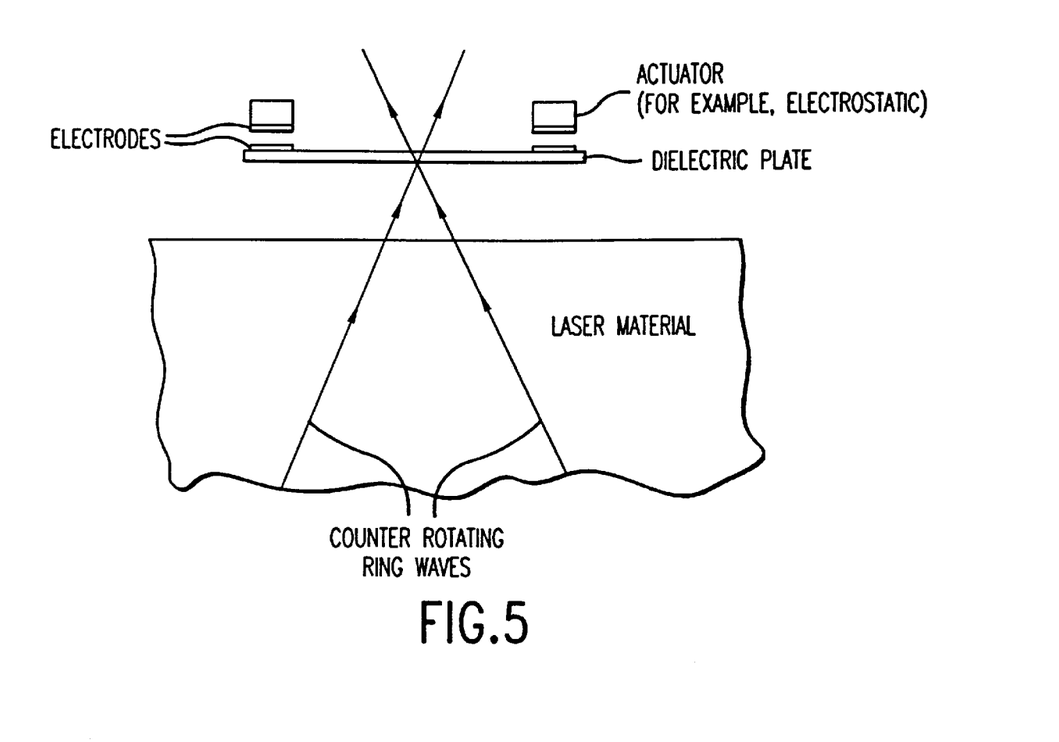
FIG. 5 is a view of an embodiment of a dielectric plate used for the decoupling and having an actuator for the manipulation of the distance of the plate to the resonator mode.

As illustrated in the embodiment in FIG. 5, the invention provides that the dielectric decoupling plate by means of a micro-actuator—such as a piezostatic or electrostatic element—is brought to the required distance from the gyro surface which corresponds to the desired transmission value. Since the transmission can be controlled electronically, the invention provides that, as the result of the measuring of the decoupled power by means of a photodiode, the distance is controlled to a fixed value. By the manipulation of the distance of the plate to the resonator mode, it is possible to influence the intensity of the decoupled power and also possibly the beam position.

This method of the decoupling can be carried out simultaneously on several sides of the gyro. The invention provides for the decoupling to be carried out, for example, simultaneously on two opposite sides. On both sides a device for measuring the Sagnac effect is installed. The simultaneous measuring at two measuring points on the laser gyro makes it possible to apply various electronic correlation processes to the measuring signals. Also in the case of a strong noise background, reliable measurements can be made by means of such correlation processes. As a result, systematic measuring anomalies in the gyro caused by its construction or operation can also be eliminated. The possibility of the electronic modulation of the transmission can, for example, be used for carrying out the decoupling at both measuring stations synchronously or asynchronously with different frequencies.

For the superimposition of the two ring waves on the photodetector, the invention provides the method of the deviation of one wave in a corner mirror successfully used by other laser gyros, which corner mirror also provides for the axes of the two ring waves for generating the interference band to impinge on the photodetector at an angle $\phi$ according to Formula (2).

Figure 6:
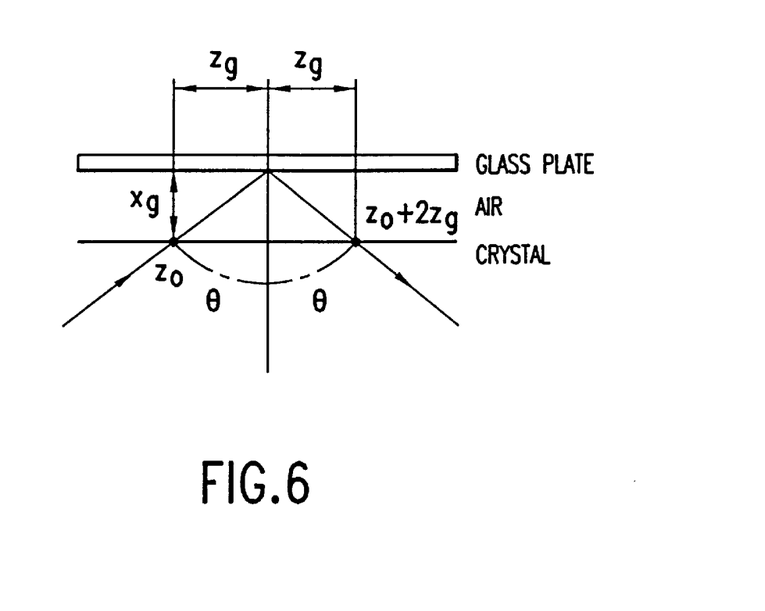
FIG. 6 is a schematic view illustrating the "Goos-H ähnchen shift" which results in a displacement of the beaming position when the distance of the dielectric plate is changed.

The invention also contemplates that the adjusting of the frequency of the solid body ring laser gyro be carried out by means of a method which is new for this purpose and which is based on the tunnelling of the light wave to a second close dielectric. The effect which is utilized here is the so-called Goos-Hänchen displacement $2z_g$ of the wave on the boundary surface, as illustrated in the embodiment in FIG. 6. When the wave emerges from the dielectric, the point of intersection of the axis of incidence and emergence is not on the surface but in a virtual reflecting point outside the surface. However, in the case of the approaching of the second dielectric (distance from the ring laser gyro $x_g$), the position of this reflecting point can be varied continuously in a distance range of $0-\lambda/2$ away from the boundary surface. In a ring laser gyro, this distance change carried out on one or several boundary surfaces results in changes of the diameter and of the angular position of the wave which absolutely results in frequency changes. Since this effect acts upon the two ring waves in the same direction, this is not the occurrence of a difference frequency as in the case of the Sagnac effect, but a common frequency shift $\Delta v$ which is a function of the length displacement $\Delta l$ as follows:

$$\Delta v = \Delta l \; v/l \qquad (4)$$

With $v=3 \cdot 10^{14}$ Hz at $\lambda=1$ $\mu$m and l=4 cm at 1 cm side length of the gyro, the possible variation range of the frequency with $\Delta l=1$ $\mu$m, is $\Delta v=1.3 \cdot 10^{10}$ or 13 GHz.

This effect can be used in multiple manners for changing and adjusting the frequency of the solid-state laser gyro. By measuring the transmission of the laser wave through the external dielectric, the distance $\Delta l$ can be determined. By controlling upon a fixed distance value, the frequency can therefore be held stable. When a very high stabilization precision is required, it is possible to guide a portion of the emerging wave into a miniaturized Fabry-Perot interferometer as the comparison frequency normal value and measure its frequency position there. By means of the thus obtained measuring signal, it is possible to trim the frequency by means of the actuator.

When now simultaneous measurements about several coordination axes are to be carried out, it is assumed that basically a ring laser gyro measures rotating movements about the space axis which stands perpendicularly on the surface which is enclosed by the laser resonator. So that this measuring direction is well-defined, the beam path should be spatially stabilized such that it extends in a plane. Since now the laser material of the solid-state laser can be manufactured not only as a flat square or rectangular plate, but also as a cube or cuboid, it is possible to simultaneously operate in a cube three completely independent lasers in three mutually perpendicular cutting planes of the cube (cuboid). All laser and measuring arrangements considered so far are designed for the excitation, decoupling and detection of the laser radiation in only one measuring plane. However, they can all be constructed in three cutting planes of the laser cube which stand perpendicularly upon one another without any mutual interference. Because of the low optical performances of the pump diodes and the measuring lasers, a cross-coupling by means of optical scattering and thermal influences between the measuring planes is negligible.

Figure 7:
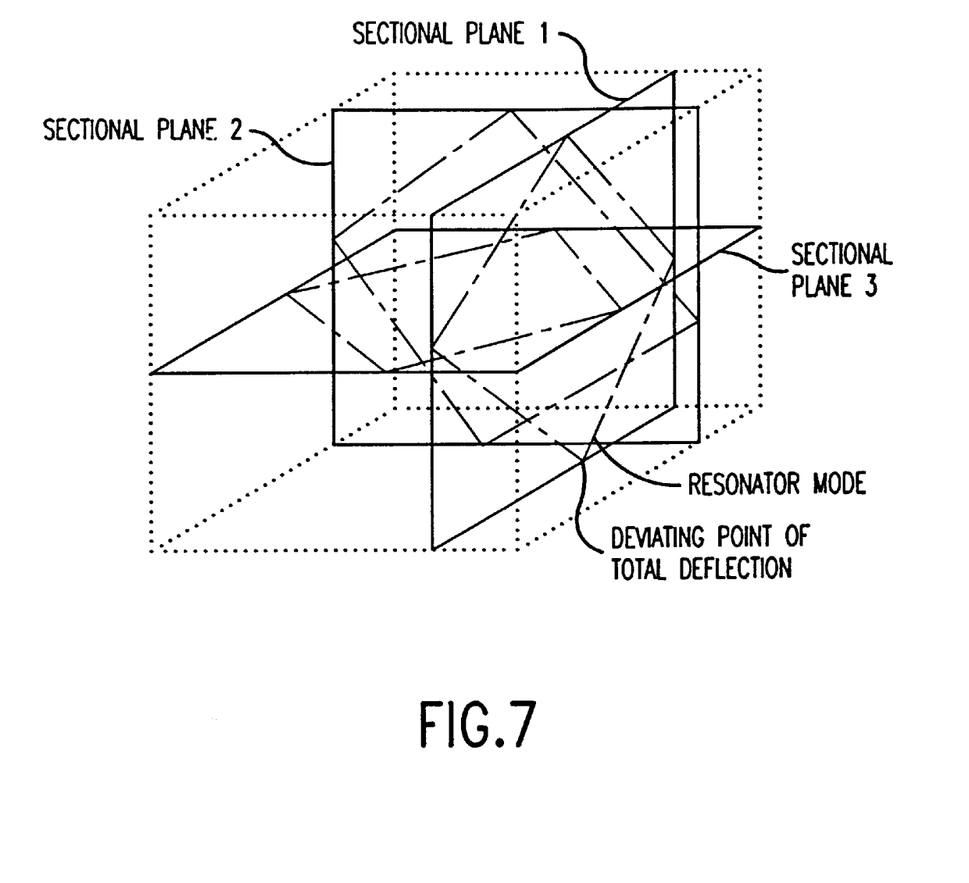
FIG. 7 is a view of a special embodiment with three independent ring lasers which are constructed in three mutually perpendicular cutting planes of a cube or cuboid.

So that the deviating points of the total reflection in the different cutting planes are separated on the sides of the cube, (cuboid) and as a result a separate construction is permitted of excitation diodes and decoupling devices of the different ring lasers, it is recommended to select the cutting planes such that they do not all extend through the center of the cube (cuboid), but extend at least by two offset from the center, as illustrated in FIG. 7, which is insignificant for the measuring.

By means of the independent three ring lasers in the cutting planes which are perpendicular to one another, rotations of the gyro simultaneously about all space axes can be detected and recorded by means of the Sagnac effect.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A gyro, comprising:
   a diode-pumped monolithic solid-state ring laser using a total reflection on boundary surfaces for the deviation of a resonator mode, said solid-state ring laser having two ring waves rotating in opposite directions in a common solid-state laser material and being simultaneously amplified;
   wherein from a difference frequency of said two ring waves, a rate of rotation of the gyro is derived;
   wherein said solid-state material includes one of doped crystal and glass material having one of a square and rectangular shape; and
   wherein certain zones of said solid-state laser material are selectively excited optically, a volume being selected to be so small that a transversal mode selection takes place.

2. The gyro according to claim 1, wherein for said optical excitation, one or more semiconductor laser diodes are used.

3. The gyro according to claim 1, wherein an adjustment of a beam path of a resonator takes place in that via two or more separate diodes simultaneously, a mode volume and an adjoining area are illuminated and a beam path is optimized by (1) a change of performance ratios of said diodes and (2) a simultaneous measuring of an output performance or a beam position of said solid-state ring laser.

4. The gyro according to claim 1, wherein two arrangements of two or more alternately controlled laser diodes are arranged on two opposite sides of said solid-state ring laser.

5. The gyro according to claim 1, further comprising two units, each having a plate for a beam decoupling, deviating prisms, and a photodetector which are arranged on two opposite sides of said solid-state laser material for reasons of symmetry.

6. The gyro according to claim 1, wherein said solid-state laser material is in the shape of one of a cube and cuboid, three independent ring lasers being constructed in three cutting planes of said cube or cuboid which are perpendicular to one another by which rates of rotation of said gyro can be detected about all three space directions.

7. A diode-pumped monolithic solid-state ring laser using a total reflection on boundary surfaces for a deviation of a resonator mode, wherein a rotation of said resonator mode with respect to a solid-state laser material of said ring laser is caused in that two or more laser diodes alternately optically excite said solid-state laser material at adjacent points and, wherein a local range of resonator modes changes because of a local displacement of an amplification range which varies with respect to time.

8. The ring laser according to claim 7, wherein certain zones of said solid-state laser material are selectively excited optically, a volume being selected to be so small that a transversal mode selection takes place and, for said optical excitation, one or more semiconductor laser diodes are used.

9. The ring laser according to claim 7, wherein an adjustment of a beam path of a resonator takes place in that via two or more separate diodes simultaneously, a mode volume and an adjoining area are illuminated and a beam path is optimized by (1) a change of performance ratios of said diodes and (2) a simultaneous measuring of an output performance or a beam position of said solid-state ring laser.

10. The ring laser according to claim 7, wherein two arrangements of two or more alternately controlled laser diodes are arranged on two opposite sides of said solid-state ring laser.

11. A gyro, comprising:
a diode-pumped monolithic solid-state ring laser using a total reflection on boundary surfaces for the deviation of a resonator mode, said solid-state ring laser has two ring waves rotating in opposite directions in a common solid-state laser material simultaneously amplified;
wherein from a difference frequency of said two ring waves, a rate of rotation of the gyro is derived;
wherein said solid-state material includes one of doped crystal and glass material having one of a square and rectangular shape; and
wherein a portion of said two ring waves which rotate in opposite directions is decoupled by a frustrated total reflection effect via one or more dielectric plates arranged close to one or more boundary surfaces from the resonator, a distance between said one or more dielectric plates and said one or more boundary surfaces being changeable by a movement of said dielectric plates.

12. The gyro according to claim 11, further comprising two units, each having a plate for beam decoupling, deviating prisms, and a photodetector which are arranged on two opposite sides of said solid-state laser material for reasons of symmetry.

13. The gyro according to claim 11, further comprising a micromechanical actuator coupled to move the dielectric plates.

14. A gyro, comprising:
a diode-pumped monolithic solid-state ring laser using a total reflection on boundary surfaces for the deviation of a resonator mode, said solid-state ring laser has two ring waves rotating in opposite directions in a common solid-state laser material simultaneously amplified;
wherein from a difference frequency of said two ring waves, a rate of rotation of the gyro is derived;
wherein said solid-state material includes one of doped crystal and glass material having one of a square and rectangular shape; and
wherein via a variation of a distance of one or more dielectric plates positioned close to one or more crystal or glass surfaces, a change of a local mode propagation in a ring resonator and hence a frequency shift is generated of said two ring waves propagating in opposite directions due to the Goos-Hähnchen shift.

15. A gyro, comprising:
a diode-pumped monolithic solid-state ring laser using a total reflection on boundary surfaces for the deviation of a resonator mode, said solid-state ring laser has two ring waves rotating in opposite directions in a common solid-state laser material simultaneously amplified;
wherein from a difference frequency of said two ring waves, a rate of rotation of the gyro is derived;
wherein said solid-state material includes one of doped crystal and glass material having one of a square and rectangular shape; and
wherein via a sound wave coupled into said solid-state laser material, a frequency shift is induced in one of said two ring waves rotating in opposite directions with respect to another of said two ring waves as a result of a Doppler shift.

* * * * *